July 26, 1938.   E. R. TAYLOR   2,125,248
DISPENSING MEANS FOR CARBONATED BEVERAGES
Filed April 6, 1935
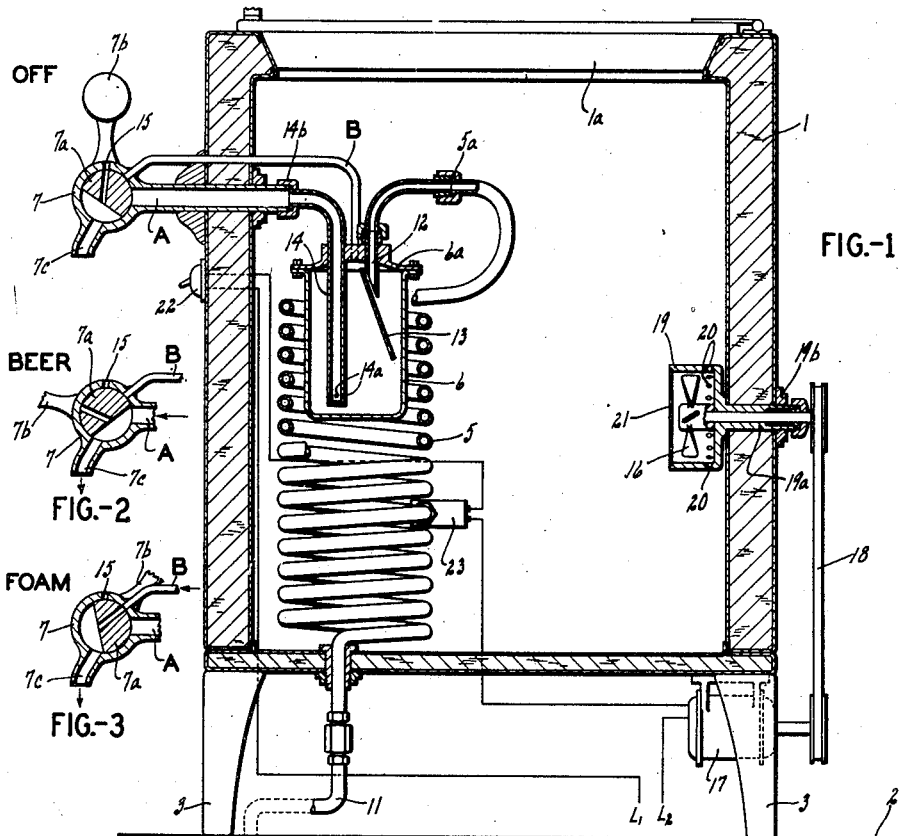
INVENTOR
EDWARD R. TAYLOR
BY
Brockett, Hyde, Higley & Meyer
ATTORNEYS Patented July 26, 1938

2,125,248

UNITED STATES PATENT OFFICE 2,125,248

DISPENSING MEANS FOR CARBONATED BEVERAGES

Edward R. Taylor, Lakewood, Ohio

Application April 6, 1935, Serial No. 14,961

5 Claims. (Cl. 225—40)

This invention relates to the dispensing of carbonated beverages and particularly contemplates the dispensing of brewed beverages such as beer; and for convenience hereinafter reference will be made to beer as typifying carbonated beverages.

Objects of the invention are to dispense the beer from a large container as a keg, cooling the beer in a particular manner as it is withdrawn from the keg by a novel and improved compact arrangement wherein a relatively small volume of the beer is subjected to a cooling medium of fixed effective temperature, with consequent decrease in beer waste.

Another object of the invention is the provision for controlled proportioning of liquid and foam in the individual drinks dispensed whereby all drinks may have uniform liquid content.

The exact nature of this invention together with further objects and advantages thereof will be apparent from the following description taken in connection with the accompanying drawing, in which Fig. 1 is generally a conventionalized side elevation showing, largely in typical sectional elevation, apparatus embodying the invention; Figs. 2 and 3 are details showing adjusted positions of parts appearing in Fig. 1; Fig. 4 is an enlarged sectional detail of parts appearing in Fig. 1; and Fig. 5 is a graph showing the cooling characteristics obtained by the invention.

With reference now to the drawing, I is a refrigerator box adapted to contain ice water or the like and for the purpose having insulated walls and a large door 1a in its top, as indicated. This box I may be supported upon a floor 2 by legs 3, or as will be appreciated, in the smaller capacities the box may simply be positioned upon the counter or bar. At 4 is indicated in broken lines a barrel or keg containing the beer or other carbonated beverage to be dispensed, which may be located in the basement below the floor 2, beneath the counter or bar, or otherwise conveniently adjacent and preferably at a lower elevation than the box I.

While the box I represents the largest part of the apparatus in bulk, the principal parts of the apparatus in functional relationship, are a cooling element 5, a container 6 of small volume of the order of a few glasses of beer and a faucet 7, these parts having connections providing their series relation as described for flow of beer sequentially therethrough from keg 4 to faucet 7.

More particularly, for withdrawing the beer from the keg under the pressure within the keg, a hollow rod 8 is inserted and sealed in the bung 4a of the keg, the keg being disposed with the bung uppermost and the rod extending downwardly through the bung and to the bottom of the keg. The outer diameter of the rod 8 being determined by the bung size, standardized in the art, but the bung opening being substantially greater than is desirable for dispensing purposes, I provide that the rod be a tube of relatively thin wall. Within this rod I provide a tube 9 of the desired smaller internal diameter, secured at its ends with the rod 8 by annular plugs 10 sealed with both tube and rod. The tube 9 terminates short of the bottom of the rod 8 which latter is closed as indicated in Fig. 4, but provided with a number of openings 8a for inlet of the beer.

The cooling element 5 may be simply a helical coil of tubing as indicated having its lower end passing through and sealed in the bottom of the box I. Suitable connection generally indicated at 11 and preferably including a valve 11a is provided leading from the upper end of the tube 9 within the rod 8, to the lower end of the element 5. The volumetric capacity of the cooling element 5 is slight as compared with the prior practice in the art, as may be that of the container 6.

This container 6 is preferably cylindrical, disposed within convolutions of the coil 5 as indicated, and has a removable top 6a with an inlet opening in which is positioned and sealed an inlet nozzle 12. The outer end of this nozzle has connection as at 5a with the upper end of the cooling coil 5 for delivery from the coil into the container and for mutual support of the parts. The nozzle 12 preferably extends slightly downwardly beyond the cover 6a as indicated, for cooperation with a directing plate 13 slopingly disposed beneath the nozzle. The arrangement is such that the nozzle may discharge beer into the hollow of the container 6 with a minimum of turbulence, the beer leaving the nozzle spreading out over the plate, above the container liquid level, and smoothly flowing into the liquid at the bottom of the container.

The faucet 7 is mounted in the front wall of the box I as indicated. As shown, it comprises a multi-way plug valve having its plug 7a arranged for adjustment by a handle 7b to control discharge from the nozzle 7c.

The container 6 has two outlets each under the control of the faucet 7. The first of these is a beer outlet, leading from the bottom part of the container 6. As here shown this is provided by a riser 14 sealed in the cover 6a of the container, extending downwardly therefrom to the bottom part of the container chamber where it is provided with a number of restricted inlet openings 14a but otherwise closed. At its outer end the riser 14 is connected as at 14b with the faucet 7 to provide beer inlet thereto through the passage A.

The second connection from the container 6 to the faucet 7 is for foam and comprises a pipe B leading from a suitable opening in the cover 6a to the body of the faucet 7.

The arrangement of the faucet parts are such that it has three positions. The first is the "off" position indicated Fig. 1, in which there is no flow through the faucet. Preferably the faucet body is provided with a port 15 registering with the indicated opening in the faucet plug 7a, when the latter is in the off position, by which air is admitted to permit free drainage from the hollow of the faucet through its nozzle 7c.

The second faucet position is indicated in Fig. 2, in which the plug 7a is adjusted by moving the handle 7b forwardly from the off position. In this position of the parts flow of beer may be had from the inlet A of the faucet through the nozzle 7c and flow is cut off from the pipe B and relief port 15.

The third faucet position, as indicated in Fig. 3, is attained by adjusting the handle 7b rearwardly from its off position. In this position of the parts flow of foam may be had from the foam connection B out through the nozzle 7c but no flow of beer, through the connection A, may be had.

To improve the cooling efficiency of the apparatus, an impeller 16 is arranged below the water line within the box 1 to create a flow against the cooling coil 5 and container 6 therewithin. This impeller is actuated by a motor 17, here shown as mounted beneath and upon the box 1 and driving through a belt 18 running over suitable pulleys as indicated. The impeller 16 is disposed within the head part of a cylindrical housing 19 having a stem part extending through its wall of the box 1 as at 19a, and there secured as by a nut 19b. As shown, the impeller is secured upon its shaft, which bears in and extends through the stem part of the housing. The head part of the housing has small peripheral inlet openings 20 back of the impeller, and a circular outlet opening 21 in front of the impeller and suitably screened as indicated, to clear ice from the moving parts of the impeller. A switch 22 is provided on the front of the box 1, preferably adjacent the faucet 7, for manual control of the motor 17. For automatic control of the motor if desired, about one-third or slightly more above the bottom of the coil 5, a thermostatic switch 23 may be provided, which, together with the switch 22, is arranged in the control circuit for the motor 17 as indicated; so that, the switch 22 being closed, the impeller 16 will have actuation automatically responsive to temperature of the coil contents at the level of the thermostat. The thermostat is set to maintain a temperature of about 47° Fahrenheit within the coil at that point, that is, to close the motor circuit upon a temperature rise thereabove, and open the motor circuit upon a temperature drop therebelow.

Operation will be as follows: The valve 7 being closed and the keg 4 having been connected with the pipe 11 and the valve 11a opened, pressure within the keg forces beer upwardly into and through the coil 5 and into the container 6, until a balance of pressures within these parts prevents further flow. The keg is at room temperature which may be in the neighborhood of 70°, and the temperature within the box 1 is in the neighborhood of 32°, the latter containing ice and water to a level sufficient to at least wholly submerge the coil 5. Such upward flow of the beer is caused by pressure of the carbon dioxide gas which it contains both in solution in the liquid and particularly in free state above the liquid in the keg. As the beer rises from the keg through the connection 11, gas is released by frictional heat and reduction of pressure at the tube 9, in the form of bubbles, travelling with the liquid in which they are entrained. As the liquid rises in the coil 5, its temperature is much reduced and some of the gas reenters the liquid, so that these bubbles are reduced in size and some may disappear. Some, however, are carried over into the container 6.

The hollow of this container comprises an expansion chamber, pressure upon the beer being somewhat reduced as the beer leaves the coil 5 and enters this chamber. Consequently some gas will be released into free state from the liquid in this expansion chamber. The chamber will thus contain in its bottom part, liquid beer and in its upper part free gas in bubble particles finely divided by liquid and commonly known as "foam". The cooperation between the nozzle 12 and plate 13 minimizes this foam to a considerable extent and the spreading effect of the plate upon the incoming stream causes the latter to present a relatively large surface area for rapid adjustment of its gas content, without turbulence. By maintaining an approximately quiescent condition the foam within the expansion chamber may drain directly into the liquid with which it is in contact. That is, the liquid between gas bubbles may drain downwardly, so that the bubble skins are thinned and the foam becomes relatively "dry" and of much less weight or liquid content than usual. Also, the liquid will take up or free as much gas as is necessary to have approximate saturation at the low temperature of the expansion chamber.

To dispense the usual individual portion of the beer into a glass, mug or other drinking container, the operator first pulls the handle 7b of the faucet 7 forwardly as in Fig. 2. This permits discharge of liquid beer only, from the container 6 by way of the riser 14. The restriction provided at the openings 14a, effective at the beer connection between the container 6 and the faucet, acts to regulate expansion of the head gas within the container 6 when beer is drawn from the faucet, provides beer flow into the container 6 approximating beer flow therefrom, and thereby assures trapping of foam within the container. After thus partially filling the drinking container, to the desired level, the operator pushes the handle rearwardly as in Fig. 3. This cuts off flow of liquid through the nozzle, which now discharges foam only. After filling of the drinking container is completed, the operator returns the handle to the off position as in Fig. 1, and the dispensing of the drink is complete, the drink including such proportions of liquid and dry foam as the operator has desired.

As pressure is reduced within the container 6 by opening the faucet, the pressure within the keg 4 causes flow into the container 6 as before, so that the latter automatically is maintained filled with beer and foam as before described. The restriction in the short beer connection between the container and the faucet here shown as at 14a, prevents too sudden lowering of pressure in the container upon withdrawal of the beer, permitting beer to flow from the keg to the container approximately as beer is withdrawn from the container. Thus the described separation of beer and foam is assured within the container, and it is unlikely that the container be emptied of beer. Should the beer content of the container be reduced sufficiently that the faucet discharge any foam in the "beer" position, the beer level in the container 6 may be raised instantly by momentarily positioning the faucet handle in the "foam" position.

As is well known in the art, beer if too warm will be unpalatable and too foamy; while if too cold it will be cloudy. According to my invention I provide that the beer dispensed will be always at a temperature in the order of 40° and to this end provide the coil 5 of relatively small volumetric capacity as compared with the prior practice in the art, surround this coil with a large volume of ice water, and maintain this water in such motion that it will have substantially constant cooling effect upon the coil for a given draft condition. The water temperature will be substantially constant at 32° and it cannot fall below 32° no matter how much it is agitated by the impeller 16. Operation of the impeller merely assures maintenance of this minimum temperature uniformly throughout the volume of water contacting the coil.

With this in mind, the parts are so proportioned and arranged that in the normal operation of the apparatus the beer within the coil and passing therethrough, will have a rapid reduction in temperature within the first few turns of the coil—about the first third of the coil length. This temperature drop will be to the neighborhood of 47°. Thereafter cooling of the beer will continue but at a decidedly lower rate during flow through the remaining two-thirds of the coil, attaining approximately 40° at the container 6. These characteristics of the cooling effect are illustrated in the graph in Fig. 5, wherein the cooling curve C' will be observed to have two approximately straight sections with a relatively sharp bend therebetween, at about 47° temperature and about one-third the length of the cooling coil.

These being the characteristic conditions during a usual dispensing rate, if the rate be decreased, the beer will be reduced to the 47° temperature about as rapidly as before but at a lower level in the cooling coil, as indicated by the curve D, Fig. 5. Similarly if the dispensing rate be increased, the beer will be reduced to 47° still about as rapidly as before but at a higher level in the cooling coil as indicated by the curve E, Fig. 5. From Fig. 5 it will be noted that the rate of heat loss in the first few turns of the coil is substantially independent of the rate of flow of the beer therein, so that between temperature limits from the initial 70° temperature, to about 50°, the three curves coincide. Each of the curves from its bend approximates a straight line to the right end of the graph indicating the outlet of the coil, but these lines have different slope. The greatest divergence between the lines is at approximately one-third the length of the cooling coil, which is the location of the thermostat 23.

In general it may be observed that my invention employs a large mass of coolant—ice water—at a constant median temperature; operation of the impeller 16 varying the effective coolant mass, rather than its temperature. This is distinguishable over systems employing brine for instance, wherein the temperature of the coolant is reduced rather than its effective mass; and from systems employing artificial refrigeration such as electrical devices wherein a concentration of refrigeration is had at relatively low temperature.

Of course the proper length of the cooling coil as well as size of pipe employed, will be determined in the first instance by the desired normal draft capacity of the apparatus. But only by the relatively short cooling coil in combination with the mass of ice water at 32°, together with circulation of the latter against the coil, can the results described and particularly those illustrated in Fig. 5, be satisfactorily attained.

It will be observed that by my invention at all times the liquid is conserved, the foam drawn which would otherwise for the most part represent waste, being always dry and containing a minimum of liquid. Also, each drink from the keg, from the first to the last, may be made uniform in foam content with all others. There is not the usual waste of the first few glasses drawn. Further, the apparatus maintains uniformity of gas content not only between drinks but between kegs having different degrees of carbon dioxide concentration.

It is also to be observed that the apparatus is of a simple nature easily assembled and particularly adapted for use in modification of existing apparatus. For example the container 6 is easily added and the faucet 7 as easily substituted, in old equipment, the container being amply supported by its two connections with the faucet, which latter is mounted directly upon the wall of the box. Similarly the water circulating impeller with its driving means may be added to any existing cooling box, requiring only a single hole in the wall of the latter.

The volumetric capacity of the coil 5 is slight, yet its cooling capacity is great as compared with the prior art, one advantage of which is in accessibility for cleaning, with minimum necessary loss of its contents for the cleaning operation.

What I claim is:

1. In apparatus for dispensing carbonated beverage, means providing an expansion chamber, having at its upper part an inlet for cooled beverage, a beverage dispensing outlet at its lower part, and a foam outlet at its upper part, means providing separate control of said outlets, and means associated with said inlet to provide a smooth flowing open beverage stream, entering said chamber above the liquid level thereof, and progressing below said level with minimum disturbance of liquid within said chamber.

2. In apparatus for dispensing carbonated beverage, a refrigerator box, a coiled beverage cooling tube therein, a container providing an expansion chamber and located within convolutions of said tube, a faucet mounted on a wall of said box, said container having inlet connection with said tube, and outlet connection with said faucet, and being supported wholly by said connections.

3. In apparatus for dispensing beer, a refrigerator box for containing ice water, an expansion container and a beer cooling element arranged to be submerged therein, means providing flow of beer through said element to said container, an impeller arranged to cause circulation of said ice water against said element, and means for causing actuation of said impeller responsive to temperature of said beer at a location approximately at the end of the first third of its path through said element.

4. In apparatus for dispensing beer, a cooling element, means providing an expansion chamber, and faucet means connected in series relation, said expansion chamber being of limited capacity of the order of a few glasses, cooling means for said chamber, said expansion chamber being adapted to accumulate gas liberated from said beer as foam, to permit reocclusion of said gas, and to provide drainage of surplus beer from said foam, said faucet means having conduit connections with said chamber providing selective dispensing of beer or foam from said chamber, and the beer connection from said chamber to said faucet means being restricted relative to the connection from said cooling element to said chamber, whereby beer cannot be drawn from said chamber more rapidly than said chamber is refilled which prevents excessive foaming in said chamber and gives time for liquid-gas balancing for each new increment of beer entering said chamber.

5. In apparatus for dispensing beer from a large container through faucet means, means providing a gas re-absorption chamber adjacent said faucet means and connected by conduit means in series relation between said faucet means and large container, said chamber being of limited capacity relative to said large container, means for cooling beer in said chamber, said chamber being adapted to accumulate gas liberated from said beer as foam, to permit re-occlusion of said gas, and to provide drainage of surplus beer from said foam, means for causing beer to enter said chamber in a smooth flowing stream with a minimum disturbance of liquid within said chamber, and the beer connection from said chamber to said faucet means being restricted relative to the connection from said large container to said chamber, whereby beer cannot be drawn from said chamber more rapidly than said chamber is refilled, which prevents excessive foaming in said chamber and gives time for liquid-gas balancing for each new increment of beer entering said chamber.

EDWARD R. TAYLOR.